United States Patent
Mishima et al.

(10) Patent No.: US 9,666,376 B2
(45) Date of Patent: May 30, 2017

(54) CONDUCTIVE PASTE AND SOLID ELECTROLYTIC CAPACITOR INCLUDING THE SAME

(71) Applicant: MURATA MANUFACTURING CO., LTD., Nagaokakyo-Shi, Kyoto-fu (JP)

(72) Inventors: Koutarou Mishima, Nagaokakyo (JP); Akihiro Nomura, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 97 days.

(21) Appl. No.: 14/493,774

(22) Filed: Sep. 23, 2014

(65) Prior Publication Data
US 2015/0009606 A1   Jan. 8, 2015

Related U.S. Application Data

(63) Continuation of application No. PCT/JP2012/084180, filed on Dec. 28, 2012.

(30) Foreign Application Priority Data

Mar. 29, 2012   (JP) .................................. 2012-076689

(51) Int. Cl.
| | | |
|---|---|---|
| H01G 9/042 | (2006.01) | |
| H01G 9/15 | (2006.01) | |
| H01G 9/045 | (2006.01) | |

(52) U.S. Cl.
CPC ........... H01G 9/0425 (2013.01); H01G 9/045 (2013.01); H01G 9/15 (2013.01)

(58) Field of Classification Search
CPC ......... H01G 9/0425; H01G 9/045; H01G 9/15
See application file for complete search history.

(56) References Cited

U.S. PATENT DOCUMENTS

| | | | | |
|---|---|---|---|---|
| 4,769,399 A | * | 9/1988 | Schenz ............. | C08G 59/5033 257/E21.505 |
| 2003/0159773 A1 | * | 8/2003 | Tomiyama ................. | C09J 7/00 156/248 |
| 2005/0118750 A1 | * | 6/2005 | Baba ...................... | H05K 1/187 438/128 |
| 2005/0254198 A1 | * | 11/2005 | Matsumoto ............ | H01G 9/028 361/523 |
| 2006/0109604 A1 | | 5/2006 | Kawashima et al. | |
| 2008/0249258 A1 | * | 10/2008 | Masuko ............. | C08G 18/6484 525/452 |

(Continued)

FOREIGN PATENT DOCUMENTS

| | | |
|---|---|---|
| CN | 101681726 A | 3/2010 |
| JP | H10-251606 A | 9/1998 |

(Continued)

OTHER PUBLICATIONS

PCT/JP/2012/084180 Written Opinion dated Mar. 15, 2013.

*Primary Examiner* — David M Sinclair
(74) *Attorney, Agent, or Firm* — Arent Fox LLP

(57) ABSTRACT

A solid electrolytic capacitor that includes a valve action metal base, an insulating layer, a solid electrolyte layer, a carbon layer and an electrode layer sequentially formed in one of two parts of the valve action metal base. The electrode layer is formed from a conductive paste that includes at least a conductive filler, a thermosetting resin containing a phenoxy resin, and a curing agent.

12 Claims, 1 Drawing Sheet

(56) References Cited

U.S. PATENT DOCUMENTS

| | | | |
|---|---|---|---|
| 2008/0297984 A1 | 12/2008 | Ogiwara et al. | |
| 2009/0140210 A1* | 6/2009 | Toshioka | C08G 59/621 |
| | | | 252/500 |
| 2009/0169724 A1 | 7/2009 | Ogiwara | |
| 2009/0178834 A1* | 7/2009 | Akutsu | C08L 71/00 |
| | | | 174/260 |
| 2012/0300426 A1* | 11/2012 | Yamamoto | H01B 1/22 |
| | | | 361/803 |

FOREIGN PATENT DOCUMENTS

| | | | |
|---|---|---|---|
| JP | 11102423 A * | 4/1999 | |
| JP | 2002-329451 A | 11/2002 | |
| JP | 2004-165423 A | 6/2004 | |
| JP | 2008-300637 A | 12/2008 | |
| JP | 2009-176728 A | 8/2009 | |
| WO | WO 2008/082772 A1 | 8/2008 | |

* cited by examiner

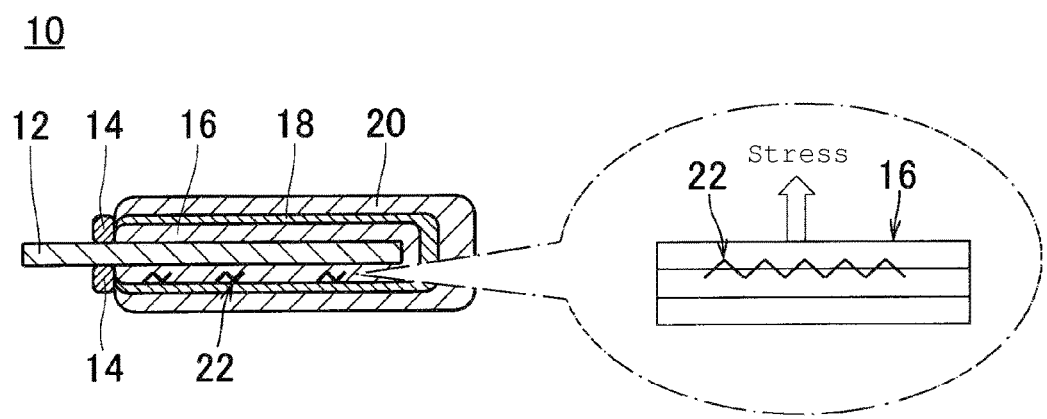

CONDUCTIVE PASTE AND SOLID ELECTROLYTIC CAPACITOR INCLUDING THE SAME

CROSS REFERENCE TO RELATED APPLICATIONS

The present application is a continuation of International application No. PCT/JP2012/084180, filed Dec. 28, 2012, which claims priority to Japanese Patent Application No. 2012-076689, filed Mar. 29, 2012, the entire contents of each of which are incorporated herein by reference.

FIELD OF THE INVENTION

The present invention relates to a conductive paste and a solid electrolytic capacitor including the same, and particularly to a conductive paste for forming an electrode layer on a capacitor element having a solid electrolyte layer, and a solid electrolytic capacitor including the conductive paste.

BACKGROUND OF THE INVENTION

A solid electrolytic capacitor is known which includes an anode body composed of a valve action metal, wherein a dielectric oxide film layer, a solid electrolyte layer and a cathode layer partially composed of a silver layer are sequentially formed on the surface of the anode body. Here, the silver layer is composed of 95% or more of a flaky silver powder, a phenol novolak type epoxy resin and/or a tris-hydroxyphenyl-metal type epoxy resin, with the flaky silver power constituting 50 to 90% of the silver layer in terms of volume.

In such a solid electrolytic capacitor, stress at the time of curing the epoxy resin used for the silver layer is high, so that contact pressure with the flaky silver powder increases, thus making it possible to reduce the resistance value of the silver layer and improve adhesion with the solid electrolyte layer or other cathode layers. Consequently, a solid electrolytic capacitor excellent in equivalent series resistance (ESR) and impedance characteristics can be obtained (see Patent Document 1).

Patent Document 1: Japanese Patent Laid-open Publication No. 2004-165423

SUMMARY OF THE INVENTION

Examples of the above-mentioned solid electrolytic capacitor include one having a solid electrolyte layer formed by chemical polymerization. Chemical polymerization is performed by, for example, repeating multiple times an operation including immersing in a monomer solution an aluminum foil having an oxide film layer, and then immersing the aluminum foil in an oxidant solution to polymerize a monomer. The solid electrolyte layer thus obtained has a multilayer structure in which interlayer peeling easily occurs under stress.

When a conductive paste for preparing a silver layer to be formed on the solid electrolytic capacitor of Patent Document 1 is used in formation of an electrode layer on the solid electrolyte layer, stress at the time of curing the conductive paste may cause interlayer peeling in the solid electrolyte layer, leading to generation of cracks in the solid electrolyte layer. When cracks are generated in the solid electrolyte layer, ESR characteristics of the solid electrolytic capacitor are deteriorated.

Accordingly, a main object of the present invention is to provide a conductive paste capable of providing a solid electrolytic capacitor having good ESR characteristics.

Further, another object of the present invention is to provide a solid electrolytic capacitor having good ESR characteristics by using the conductive paste of the present invention.

The present invention provides a conductive paste used for forming an electrode of a solid electrolytic capacitor, the conductive paste including at least a conductive filler, a thermosetting resin containing a phenoxy resin, and a curing agent.

The phenoxy resin has a higher molecular weight than an epoxy resin or the like, and has small shrinkage at the time of curing. Use of such a conductive paste containing a thermosetting resin containing a phenoxy resin can reduce stress applied to a solid electrolyte layer at the time of forming an electrode. Therefore, generation of cracks in the solid electrolyte layer can be prevented, so that a solid electrolytic capacitor having good ESR characteristics can be obtained.

In the conductive paste, the molecular weight of the phenoxy resin is preferably 30000 to 100000.

When the molecular weight of the phenoxy resin contained in the conductive paste is small, shrinkage at the time of curing may increase so that large stress may be applied to the solid electrolyte layer. By using a phenoxy resin having a molecular weight of 30000 to 100000, a solid electrolytic capacitor having good ESR characteristics can be obtained.

The total content of the phenoxy resin and the curing agent in such an amount as to react with the phenoxy resin, in the total of the thermosetting resin and the curing agent in such an amount as to react with the thermosetting resin, is preferably 10% by mass or more.

When the content of the phenoxy resin is small, the effect of reducing shrinkage at the time of curing the thermosetting resin may no longer be obtained so that large stress may be applied to the solid electrolyte layer. By ensuring that the total content of the phenoxy resin and the curing agent in such an amount as to react with the phenoxy resin, in the total of the thermosetting resin and the curing agent in such an amount as to react with the thermosetting resin, is 10% by mass or more, a solid electrolytic capacitor having good ESR characteristics can be obtained.

Further, the content of the conductive filler in the solid content of the conductive paste is preferably 75 to 95% by mass.

When the content of the conductive filler is small, the amount of the thermosetting resin increases, and therefore shrinkage at the time of curing the conductive paste may increase so that large stress may be applied to the solid electrolyte layer. When the content of the conductive filler is large, and the amount of the thermosetting resin is excessively small, the shrinkage ratio of the conductive paste may decrease to increase the distance between conductive filler particles, leading to a reduction in conductivity of the electrode layer obtained. By using a conductive paste having a conductive filler content of 75 to 95% by mass, a solid electrolytic capacitor having good ESR characteristics can be obtained.

Further, the present invention provides a solid electrolytic capacitor including a valve action metal base, a solid electrolyte layer formed on the valve action metal base, and an electrode layer formed on the solid electrolyte layer, wherein the electrode layer is formed using any one of the conductive pastes described above.

By forming an electrode layer using the above-mentioned conductive paste, a solid electrolytic capacitor that is free from generation of cracks in a solid electrolyte layer and has good ESR characteristics can be obtained.

According to the present invention, a solid electrolytic capacitor having good ESR characteristics can be obtained.

The above-mentioned objects, other objects, features and advantages of the present invention will become more apparent from the following descriptions in "MODE FOR CARRYING OUT THE INVENTION" with reference to the drawing.

BRIEF EXPLANATION OF THE DRAWING

The FIGURE is an illustration showing one example of a solid electrolytic capacitor of the present invention.

DETAILED DESCRIPTION OF THE INVENTION

The FIGURE is an illustration showing one example of a solid electrolytic capacitor of the present invention. A solid electrolytic capacitor 10 includes a valve action metal base 12. As the valve action metal base 12, for example, a chemically converted aluminum foil is used. The chemically converted aluminum foil has a dielectric oxide film formed on the periphery of an aluminum foil, and is used as an anode element. Here, the dielectric oxide film can be formed by chemically converting the surface of an aluminum foil using an aqueous ammonium adipate solution or the like.

An insulating layer 14 is formed at a predetermined distance from one end of the valve action metal base 12. The insulating layer 14 is formed in a belt shape so as to make one round of the valve action metal base 12. A solid electrolyte layer 16 is formed by, for example, chemical polymerization in one of two parts of the valve action metal base 12, which has a larger area, the parts being separated from each other by the insulating layer 14. The solid electrolyte layer 16 is formed by repeating a process multiple times, the process including immersing a chemically converted aluminum foil in a monomer solution, and then immersing the chemically converted aluminum foil in an oxidant solution. Since the solid electrolyte layer 16 is formed by such chemical polymerization, the solid electrolyte layer 16 has a multilayer structure. For forming the solid electrolyte layer 16, for example, a conductive polymer of polythiophene can be used.

A carbon layer 18 is formed on the solid electrolyte layer 16. The carbon layer 18 is formed by applying a carbon paste onto the solid electrolyte layer 16 and drying the carbon paste. As the carbon paste, for example, one made of carbon particles, a resin, a solvent and so on can be used. Examples of the carbon particles include graphite and carbon black. Examples of the resin include polyesters, phenols and epoxies. The solvent is not particularly limited, and examples thereof include acetate-based solvents, carbitol-based solvents and water.

An electrode layer 20 as a cathode layer is formed on the carbon layer 18. The electrode layer 20 is formed by applying a conductive paste onto the carbon layer 18 and drying the conductive paste.

As the conductive paste for forming the electrode layer 20, a paste made of a conductive filler, a thermosetting resin containing a phenoxy resin, a curing agent, a diluent, a curing accelerator and so on is used. As the conductive filler, for example, a flaky silver powder is used. Use of a flaky silver power can increase the contact area between silver powder particles when the conductive paste is cured, so that the resistance value of the electrode layer 20 can be reduced. The ratio of the conductive filler in the solid content of the conductive paste is set to be 75 to 95% by mass. The solid content is the remainder of the conductive paste after a volatile component (solvent) is removed from the conductive paste.

As the thermosetting resin, for example, a cresol novolak type epoxy resin and a phenoxy resin are used. Besides, a phenol novolak type epoxy resin, a bisphenol type epoxy resin and the like can be used. The phenoxy resin is a polyhydroxy polyether synthesized from a bisphenol and epichlorohydrin, and has a weight average molecular weight (Mw) of 15000 or more, but herein one having a weight average molecular weight (Mw) of 30000 to 100000 is used.

As the curing agent for the epoxy resin and the phenoxy resin, for example, a phenol resin is used. These resins are blended such that the ratio of the total of the phenoxy resin and the curing agent in such an amount as to react with the phenoxy resin to the total of the epoxy resin, the phenoxy resin and the curing agent in such an amount as to react therewith is 10% by mass or more. Besides the phenol resin, an acid anhydride-based curing agent, an amine-based curing agent and the like can be used.

As the diluent, for example, dipropylene methyl ether acetate or the like is used. Besides, an acetate-based organic solvent, a carbitol-based organic solvent and the like can be used. As the curing accelerator, for example, a tertiary amine-based curing accelerator and an imidazole-based curing accelerator are used.

The electrode layer 20 is formed on the carbon layer 18 using the above-mentioned conductive paste. Here, since the insulating layer 14 is formed, a short-circuit between the valve action metal base 12 and the electrode layer 20 is prevented.

The epoxy resin used for the conductive paste for forming the electrode layer 20 usually has a weight average molecular weight (Mw) of 2000 or less, and the phenoxy resin used therefore has a weight average molecular weight (Mw) of 30000 to 100000. As compared to a resin having a large molecular weight, a resin having a small molecular weight has large shrinkage at the time of curing. Therefore, when the phenoxy resin is not used, but only the epoxy resin is used, shrinkage at the time of curing the conductive paste is large, so that stress is applied to the solid electrolyte layer 16. In the solid electrolyte layer 16 having a multilayer structure, interlayer peeling easily occurs under stress as shown in the FIGURE, so that microcracks 22 are easily generated in the solid electrolyte layer 16 at the time of curing the conductive paste.

Here, when a phenoxy resin having a large molecular weight is included, shrinkage at the time of curing the conductive paste can be reduced, so that generation of microcracks in the solid electrolyte layer 16 can be prevented. Particularly, use of a phenoxy resin having a weight average molecular weight (Mw) of 30000 to 100000 can reduce stress applied to the solid electrolyte layer 16 at the time of curing the conductive paste. When the weight average molecular weight (Mw) of the phenoxy resin is less than 30000, shrinkage at the time of curing the conductive paste increases, so that stress applied to the solid electrolyte layer 16 increases, leading to generation of microcracks in the solid electrolyte layer 16. Therefore, equivalent series resistance (ESR) characteristics of the solid electrolytic capacitor 10 are deteriorated.

When these resins are blended such that the ratio of the total of the phenoxy resin and the curing agent in such an amount as to react with the phenoxy resin to the total of the epoxy resin, the phenoxy resin and the curing agent in such an amount as to react therewith is 10% by mass or more, stress applied to the solid electrolyte layer 16 at the time of curing the conductive paste can be reduced. When the ratio of the total of the phenoxy resin and the curing agent in such an amount as to react with the phenoxy resin is less than 10% by mass, shrinkage at the time of curing the conductive paste increases, so that stress applied to the solid electrolyte layer 16 increases, leading to generation of microcracks in the solid electrolyte layer 16. Therefore, ESR characteristics of the solid electrolytic capacitor 10 are deteriorated.

Further, the ratio of the conductive filler in the solid content of the conductive paste is preferably 75 to 95% by mass. When the ratio of the conductive filler is less than 75% by mass, the ratio of the resin increases, so that stress applied to the solid electrolyte layer 16 at the time of curing the conductive paste increase, leading to deterioration of ESR characteristics. When the ratio of the conductive filler in the solid content of the conductive paste is more than 95% by mass, the ratio of the resin decreases, and thus stress at the time of curing the conductive paste is insufficient, so that contact between conductive filler particles becomes poor, leading to deterioration of ESR characteristics.

As the conductive filler, a silver powder is preferably used. As compared to a copper powder or the like, the silver powder has a lower resistivity and is harder to be oxidized in the air, so that good ESR characteristics can be obtained.

By using the above-mentioned conductive paste, the electrode layer 20 can be formed without generating microcracks in the solid electrolyte layer 16, and the solid electrolytic capacitor 10 having good ESR characteristics can be obtained.

A capacitor chip can be obtained by resistance-welding the exposed part of the valve action metal base 12 of the obtained solid electrolytic capacitor 10 to an external connection terminal, bonding the electrode layer 20 as a cathode layer with another external connection terminal by a conductive adhesive, and performing sealing with an exterior resin in such a manner as to expose a part of these external connection terminals.

The phenoxy resin has a large weight average molecular weight (Mw), and therefore has a viscosity higher than that of a resin having a small weight average molecular weight. The conductive paste is diluted with a diluent and applied onto the carbon layer 18, but when only a low-viscosity resin is included, the conductive paste applied onto the carbon layer runs down. Therefore, it is necessary to lower the rate of dilution of the conductive paste, but in this case, the conductive paste is thickly deposited. On the other hand, a conductive paste containing a phenoxy resin has a relatively high viscosity, and therefore the conductive paste can be deposited on the carbon layer 18 even when the rate of dilution of the conductive paste is increased. At this time, by increasing the rate of dilution of the conductive paste, the conductive paste can be thinly deposited on the carbon layer 18, so that the thickness of the electrode layer 20 can be reduced. Therefore, by using the conductive paste of the present invention, the solid electrolytic capacitor can be downsized.

This conductive paste has low stress at the time of curing, and therefore the strength of the solid electrolyte layer is low, so that an excellent effect can be exhibited in a solid electrolytic capacitor in which a dielectric oxide film formed under the solid electrolyte layer is very thin.

Example 1

As a valve action metal base in a solid electrolytic capacitor, a chemically converted aluminum foil having a length of 3 mm in the minor axis direction, a length of 10 mm in the major axis direction and a thickness of 100 μm was used. For obtaining the chemically converted aluminum foil, a dielectric oxide film was formed so as to cover an aluminum foil, and the obtained chemically converted aluminum foil was used as an anode element. The dielectric oxide film was formed by chemically converting the surface of an aluminum foil using an aqueous ammonium adipate solution.

Next, at a predetermined distance from one end of the chemically converted aluminum film in the major axis direction, a belt-shaped insulating layer was formed so as to make one round of the chemically converted aluminum foil for preventing a short-circuit between an anode and a cathode. Thereafter, a solid electrolyte layer was formed in one of two parts of the chemically converted aluminum foil, which had a larger area, the parts being separated from each other by the insulating layer. At this time, the solid electrolyte layer was formed by repeating a process multiple times, the process including immersing a dielectric oxide film-formed surface of the chemically converted aluminum foil in a monomer solution, and then immersing the surface of the chemically converted aluminum foil in an oxidant solution. For obtaining the solid electrolyte layer, a conductive polymer of polythiophene was used.

Next, a carbon paste was applied onto the solid electrolyte layer, and dried to form a carbon layer. As the carbon paste, one made of carbon particles, a phenol resin and a carbitol-based organic solvent was used. The conductive paste was applied onto the obtained carbon layer, and dried to form an electrode layer.

The exposed part of the valve action metal base of the solid electrolytic capacitor thus obtained was bonded to an external connection terminal by resistance welding, and the electrode layer was bonded to another external connection terminal by a conductive adhesive. Thereafter, sealing with an exterior resin was performed in such a manner as to expose a part of the external connection terminals to obtain a capacitor chip (including one solid electrolytic capacitor).

The conductive paste for forming the electrode layer includes a flaky silver powder (D50=3.3 μm) as a conductive filler, a cresol novolak type epoxy resin (Mw=2000) as a base resin, a phenoxy resin, a phenol resin as a curing agent, dipropylene methyl ether acetate as a diluent, and an imidazole-based curing accelerator as a curing accelerator.

In each example and comparative example, the materials were mixed in the blending ratio shown in Table 1 to prepare a conductive paste.

TABLE 1

| | Blending ratio (% by mass) | | | | | | |
|---|---|---|---|---|---|---|---|
| | Conductive filler | | Thermosetting resin | | Curing agent | Curing | |
| | Silver powder | Silver-coated copper powder | Base resin | Phenoxy resin | Phenol resin | accelerator Imidazole | Diluent DPMA |
| Example 1 | 63.9 | — | 2.8 | 1.8 | 1.4 | 0.1 | 30.0 |
| Example 2 | 63.9 | — | 2.8 | 1.8 | 1.4 | 0.1 | 30.0 |
| Example 3 | 63.9 | — | 2.8 | 1.8 | 1.4 | 0.1 | 30.0 |
| Example 4 | 63.9 | — | 2.8 | 1.8 | 1.4 | 0.1 | 30.0 |
| Example 5 | 63.9 | — | 2.8 | 1.8 | 1.4 | 0.1 | 30.0 |
| Example 6 | 63.9 | — | 2.8 | 1.8 | 1.4 | 0.1 | 30.0 |
| Example 7 | 63.9 | — | 4.0 | 0.1 | 2.0 | 0.1 | 30.0 |
| Example 8 | 66.4 | — | 4.0 | 0.3 | 2.0 | 0.1 | 31.2 |
| Example 9 | 63.9 | — | 3.7 | 0.6 | 1.8 | 0.1 | 30.0 |
| Example 10 | 63.9 | — | 3.3 | 1.2 | 1.6 | 0.1 | 29.9 |
| Example 11 | 63.9 | — | 2.5 | 2.4 | 1.2 | 0.1 | 30.0 |
| Example 12 | 63.9 | — | 2.0 | 2.9 | 1.0 | 0.1 | 30.0 |
| Example 13 | 63.9 | — | — | 5.9 | 0.1 | 0.1 | 30.0 |
| Example 14 | 67.8 | — | 1.0 | 0.7 | 0.5 | 0.1 | 30.0 |
| Example 15 | 66.5 | — | 1.6 | 1.0 | 0.8 | 0.1 | 30.0 |
| Example 16 | 55.9 | — | 6.6 | 4.1 | 3.3 | 0.1 | 30.0 |
| Example 17 | 52.5 | — | 8.2 | 5.1 | 4.1 | 0.1 | 30.0 |
| Example 18 | 48.7 | — | 10.0 | 6.2 | 4.9 | 0.2 | 30.0 |
| Example 19 | — | 63.2 | 3.2 | 2.0 | 1.6 | 0.1 | 30.0 |
| Comparative Example 1 | 63.9 | — | 4.1 | — | 2.0 | 0.1 | 30.0 |

Base resin: cresol novolak type epoxy resin
DPMA: dipropylene methyl ether acetate A cathode layer was formed on the carbon layer using the above-mentioned conductive paste. Here, the conductive paste was applied onto the carbon layer by immersion, a heat treatment was performed at 80° C. for 30 minutes, and then a heat treatment was performed at 200° C. for 60 minutes to form an electrode layer.

For the capacitor chip thus obtained, the ESR was measured at 100 kHz using an LCR meter. At this time, the ESR was measured for 10 capacitor chips, and an average thereof was employed as a measurement result. When the ESR was 23 mohm or less, the chip capacitor was marked with "Very Good" because the electrostatic capacity did not decrease even when the solid electrolytic capacitor was used in a high-frequency range. When the ESR was more than 23 mohm and not more than 33 mohm, the chip capacitor was marked with "Good" because a decrease in electrostatic capacity was small even when the solid electrolytic capacitor was used in a high-frequency range. When the ESR was 50 mohm or more, the chip capacitor was marked with "Poor" because the electrostatic capacity decreased when the solid electrolytic capacitor was used in a high-frequency range. ESR measurement results and ESR assessment results for Examples 1 to 19 and Comparative Example 1 are shown in Table 2.

TABLE 2

| | Base resin component | | Phenoxy resin component | | Filler component | | ESR | |
|---|---|---|---|---|---|---|---|---|
| | Molecular weight (Mw) | Ratio in resin (% by mass) | Molecular weight (Mw) | Ratio in resin (% by mass) | Ratio in conductive paste (% by mass) | Type of filler | (mohm) | Assessment |
| Example 1 | 2000 | 70 | 50000 | 30 | 91 | Silver powder | 16 | Very Good |
| Example 2 | 2000 | 70 | 15000 | 30 | 91 | Silver powder | 32 | Good |
| Example 3 | 2000 | 70 | 30000 | 30 | 91 | Silver powder | 20 | Very Good |
| Example 4 | 2000 | 70 | 40000 | 30 | 91 | Silver powder | 17 | Very Good |
| Example 5 | 2000 | 70 | 60000 | 30 | 91 | Silver powder | 18 | Very Good |
| Example 6 | 2000 | 70 | 100000 | 30 | 91 | Silver powder | 23 | Very Good |
| Example 7 | 2000 | 99 | 50000 | 1 | 91 | Silver powder | 33 | Good |
| Example 8 | 2000 | 95 | 50000 | 5 | 91 | Silver powder | 29 | Good |
| Example 9 | 2000 | 90 | 50000 | 10 | 91 | Silver powder | 23 | Very Good |
| Example 10 | 2000 | 80 | 50000 | 20 | 91 | Silver powder | 18 | Very Good |
| Example 11 | 2000 | 60 | 50000 | 40 | 91 | Silver powder | 16 | Very Good |
| Example 12 | 2000 | 50 | 50000 | 50 | 91 | Silver powder | 17 | Very Good |
| Example 13 | — | 0 | 50000 | 100 | 91 | Silver powder | 23 | Very Good |
| Example 14 | 2000 | 70 | 50000 | 30 | 97 | Silver powder | 29 | Good |
| Example 15 | 2000 | 70 | 50000 | 30 | 95 | Silver powder | 18 | Very Good |
| Example 16 | 2000 | 70 | 50000 | 30 | 80 | Silver powder | 21 | Very Good |
| Example 17 | 2000 | 70 | 50000 | 30 | 75 | Silver powder | 23 | Very Good |
| Example 18 | 2000 | 70 | 50000 | 30 | 70 | Silver powder | 33 | Good |
| Example 19 | 2000 | 70 | 50000 | 30 | 90 | Silver-coated copper | 21 | Very Good |

TABLE 2-continued

| | Base resin component | | Phenoxy resin component | | Filler component | | ESR | |
|---|---|---|---|---|---|---|---|---|
| | Molecular weight | Ratio in resin | Molecular weight | Ratio in resin | Ratio in conductive paste | Type of filler | | |
| | (Mw) | (% by mass) | (Mw) | (% by mass) | (% by mass) | | (mohm) | Assessment |
| Comparative Example 1 | 2000 | 100 | — | 0 | 92 | Silver powder | 50 | Poor |

In Examples 1 to 6, the mass ratio of the base resin component/the phenoxy resin component was 70/30, the content of the conductive filler in the solid content of the conductive paste was 91% by mass, and the weight average molecular weight (Mw) of the phenoxy resin was 50000, 15000, 30000, 40000, 60000 and 100000, respectively. Here, the mass ratio of the base resin component/the phenoxy resin component being 70/30 means that the mass ratio of (base resin+equivalent amount of curing agent)/(phenoxy resin+equivalent amount of curing agent) is 70/30, i.e. the ratio of the total of the phenoxy resin and the curing agent in such an amount as to react with the phenoxy resin to the total of the epoxy resin, the phenoxy resin and the curing agent in such an amount as to react therewith is 30% by mass.

A relationship between the base resin component and the phenoxy resin component will now be described. The base resin component is a component containing an epoxy resin as a base resin and a curing agent in such an amount as to react with the epoxy resin. The phenoxy resin component is a component containing a phenoxy resin and a curing agent in such an amount as to react with the phenoxy resin. The epoxy equivalent and the hydroxyl equivalent should be taken into account in the curing reaction of the resin with the curing agent. The epoxy equivalent is the molecular weight per one epoxy group (site involved in curing reaction), and the hydroxyl equivalent is the molecular weight per one hydroxyl group (reaction site of curing agent).

The thermosetting resin and the curing agent are mixed at a blending ratio of epoxy equivalent:hydroxyl equivalent. Here, the epoxy equivalents of the epoxy resin as a base resin and the phenoxy resin are 218 and 7800, respectively. The hydroxyl equivalent of the phenol resin as a curing agent is 105. Therefore, as shown in Table 3, 48.17 g and 1.35 g of curing agents are required for 100 g of the base resin and 100 g of the phenoxy resin, respectively. Where each of the amounts of the base resin and the phenoxy resin is 100 g as described above, the total amount of the base resin and the curing agent that reacts with the base resin is 148.17 g, and the total amount of the phenoxy resin and the curing agent that reacts with the phenoxy resin is 101.35 g.

TABLE 3

| | Epoxy/hydroxyl equivalent | Equivalent blending amount (g) | | Resin ratio (% by mass) | | Weighed amount (g) |
|---|---|---|---|---|---|---|
| Base resin | 218 | 100.00 | | 47.24 | | 47.24 |
| Phenoxy resin | 7800 | | 100.00 | | 29.60 | 29.60 |
| Curing agent | 105 | 48.17 | 1.35 | 22.76 | 0.40 | 23.16 |
| Total | | 148.17 | 101.35 | 70.00 | 30.00 | |

Here, a case is described where the mass ratio of the base resin component/the phenoxy resin component is 70/30 as shown in Example 1. For the base resin component, a ratio of the base resin required for 148.17 g of the base resin component to constitute 70% by mass of the total of the base resin, the phenoxy resin and the curing agent may be determined by multiplying 100 g of the base resin by 70/148.17, and the resulting value is 47.24% by mass. Similarly, for the curing agent that reacts with the base resin, 48.17 g of the curing agent may be multiplied by 70/148.17, and the resulting value is 22.76% by mass.

For the phenoxy resin component, a ratio of the phenoxy resin required for 101.35 g of the phenoxy resin component to constitute 30% by mass of the total of the base resin, the phenoxy resin and the curing agent may be determined by multiplying 100 g of the phenoxy resin by 30/101.35, and the resulting value is 29.60% by mass. Similarly, for the curing agent that reacts with the phenoxy resin, 1.35 g of the curing agent may be multiplied by 30/101.35, and the resulting value is 0.40% by mass. Therefore, it can be ensured that the mass ratio of the base resin component/the phenoxy resin component is 70/30 when the base resin, the phenoxy resin and the curing agent are blended at the ratio of 47.24 g:29.60 g:23.16 g, respectively, as shown in the weighed amount in Table 3.

Here, in the case where the total of the base resin, the phenoxy resin and the curing agent constitutes 6.0% by mass of the conductive paste as shown in Example 1 in Table 1, the ratios of the base resin, the phenoxy resin and the curing agent are 2.8% by mass, 1.8% by mass and 1.4% by mass, respectively, of the conductive paste when the base resin, the phenoxy resin and the curing agent are blended at the ratio of 47.24% by mass:29.60% by mass:1.75% by mass, respectively, as described above. In this manner, the blending ratio of each resin can be determined from the blending ratio of the total of the base resin, the phenoxy resin and the curing agent in the conductive paste and the ratio of the base resin component/the phenoxy resin component. For Examples 2 to 19 and Comparative Example 1, the bending ratio of each resin is similarly determined.

It is apparent from Examples 1 and 3 to 6 that when the phenoxy resin contained in the conductive paste has a high weight average molecular weight (Mw) of 30000 or more, shrinkage at the time of curing the conductive paste decreases, so that stress applied to the solid electrolyte layer decreases. Therefore, microcracks are not generated in the solid electrolyte layer, and thus excellent ESR characteristics can be obtained. In Example 2, the phenoxy resin contained in the conductive paste has a small weight average molecular weight (Mw) of less than 30000, and therefore shrinkage at the time of curing the conductive paste is large as compared to Examples 1 and 3 to 6, so that stress applied to the solid electrolyte layer increases, leading to generation of microcracks in the solid electrolyte layer. However, good ESR characteristics were obtained because generation of microcracks was negligible.

In Examples 7 to 13, the ESR of the capacitor chip was measured with the weight average molecular weight (Mw) of the phenoxy resin being 50000, the content of the conductive filler in the solid content of the conductive paste being 91% by mass, and the ratio of the phenoxy resin component to the total of the epoxy resin component and the phenoxy resin component being 1% by mass, 5% by mass, 10% by mass, 20% by mass, 40% by mass, 50% by mass or 100% by mass.

When the phenoxy resin component is contained in an amount of 10% by mass or more based on the total of the base resin component and the phenoxy resin component as shown in Examples 9 to 13, shrinkage at the time of curing the conductive paste is small, so that stress applied to the solid electrolyte layer decreases. Therefore, microcracks are not generated in the solid electrolyte layer, and thus excellent ESR characteristics can be obtained. In Examples 7 and 8, the phenoxy resin is contained in an amount of less than 10% by mass based on the total of the base resin component and the phenoxy resin component, and therefore shrinkage at the time of curing the conductive paste is large, so that stress applied to the solid electrolyte layer increases, leading to generation of microcracks in the solid electrolyte layer. However, good ESR characteristics were obtained because generation of microcracks was negligible.

In Examples 14 to 18, the ESR of the capacitor chip was measured with the mass ratio of the base resin component/the phenoxy resin component being 70/30, the weight average molecular weight (Mw) of the phenoxy resin being 50000, and the content of the conductive filler in the solid content of the conductive paste being 97% by mass, 95% by mass, 80% by mass, 75% by mass or 70% by mass.

As shown in Examples 15 to 17, excellent ESR characteristics can be obtained when the ratio of the conductive filler in the solid content of the conductive paste is 75 to 95% by mass. In Example 14, the ratio of the conductive filler in the solid content of the conductive paste is as high as 97% by mass, and therefore the amount of the resin component in the conductive paste decreases, so that stress at the time of curing the conductive paste is excessively low, leading to poor contact between conductive filler particles. However, good ESR characteristics were obtained because microcracks were not generated in the solid electrolyte layer. When the ratio of the conductive filler in the solid content of the conductive paste is as low as 70% by mass as shown in Example 18, stress at the time of curing the conductive paste increases as compared to Examples 15 to 17, so that microcracks are generated in the solid electrolyte layer. However, good ESR characteristics were obtained because generation of microcracks was negligible.

In Example 19, a solid electrolytic capacitor was prepared using a conductive paste prepared in the same manner as in Example 1 except that a flaky silver-coated copper powder (D50=4.0 μm) was used as a conductive filler, and the content of the conductive filler in the solid content of the conductive paste was 90% by mass, and the ESR of the obtained capacitor chip was measured.

In Example 19, a flaky silver-coated copper powder (D50=4.0 μm) was used as a conductive filler. Copper has a resistivity higher than that of silver, and a higher ESR value is shown as compared to Example 1, but excellent ESR characteristics were obtained by using a resin component including a phenoxy resin.

Further, as Comparative Example 1, a solid electrolytic capacitor was prepared using a conductive paste prepared in the same manner as in Example 1 except that the conductive paste did not contain a phenoxy resin, and the content of the conductive filler in the solid content of the conductive paste was 92% by mass, and the ESR of the capacitor chip obtained using the solid electrolytic capacitor was measured.

In Comparative Example 1, a conductive paste that does not contain a phenoxy resin is used. Since this conductive paste did not contain a phenoxy resin having a high weight average molecular weight (Mw), stress at the time of curing the conductive paste increased, leading to generation of microcracks in the solid electrolyte layer, so that a solid electrolytic capacitor having good ESR characteristics was not obtained.

From the results of measuring ESR characteristics using the examples and comparative example described above, it is apparent that a solid electrolytic capacitor having excellent ESR characteristics can be obtained by using a conductive paste which contains a predetermined amount of phenoxy resin having a weight average molecular weight (Mw) falling within a predetermined range and which includes a predetermine amount of a conductive filler.

DESCRIPTION OF REFERENCE SYMBOLS

10 Solid electrolytic capacitor
12 Valve action metal base
14 Insulating layer
16 Solid electrolyte layer
18 Carbon layer
20 Electrode layer
22 Microcrack

The invention claimed is:

1. A solid electrolytic capacitor comprising:
   a valve action metal base;
   a solid electrolyte layer adjacent the valve action metal base; and
   an electrode layer adjacent the solid electrolyte layer, wherein
   the electrode layer is formed using a conductive paste comprising:
      a conductive filler;
      a thermosetting resin containing a phenoxy resin and an epoxy resin; and
      a curing agent, wherein
      a molecular weight of the phenoxy resin is 30000 to 100000,
      a total content of the phenoxy resin to a total of the thermosetting resin is 10% to 30% by mass, and
      a content of the conductive filler is 75 to 95% by mass.

2. The solid electrolytic capacitor according to claim 1, wherein the curing agent is a phenol resin.

3. The solid electrolytic capacitor according to claim 1, wherein the conductive filler is a flaky silver powder.

4. The solid electrolytic capacitor according to claim 1, wherein the epoxy resin is selected from the group consisting of a cresol novolak epoxy resin, a phenol novolak epoxy resin, and a bisphenol novolak resin.

5. The solid electrolytic capacitor according to claim 1, further comprising a diluent.

6. The solid electrolytic capacitor according to claim 5, wherein the diluent is selected from the group consisting of dipropylene methyl ether acetate, an acetate-based organic solvent, and a carbitol-based organic solvent.

7. The solid electrolytic capacitor according to claim 1, further comprising a curing accelerator.

8. The solid electrolytic capacitor according to claim 7, wherein the curing accelerator is selected from the group consisting of a tertiary amine-based curing accelerator and an imidazole-based curing accelerator.

9. The solid electrolytic capacitor according to claim 1, further comprising an insulating layer at a predetermined distance from one end of the valve action metal base.

10. The solid electrolytic capacitor according to claim 9, wherein the insulating layer is in a belt shape around the valve action metal base so as to divide the valve action metal base into first and second parts.

11. The solid electrolytic capacitor according to claim 10, wherein the solid electrolyte layer is adjacent a larger of the first and second parts of the valve action metal base.

12. The solid electrolytic capacitor according to claim 1, further comprising a carbon layer between the solid electrolyte layer and the electrode layer.

* * * * *